United States Patent [19]

Rampal

[11] Patent Number: 6,149,386
[45] Date of Patent: *Nov. 21, 2000

[54] SWASH-PLATE DEVICE FOR CONTROLLING THE PITCH OF ROTOR BLADES WITH NON-ROTATING PLATE ARTICULATED BY COTTERS ON A CENTRAL BALL JOINT

[75] Inventor: Etienne Rampal, Marseilles, France

[73] Assignee: Eurocopter, France

[*] Notice: This patent is subject to a terminal disclaimer.

[21] Appl. No.: 09/170,494

[22] Filed: Oct. 13, 1998

[30] Foreign Application Priority Data

Nov. 13, 1997 [FR] France ................... 97 14231

[51] Int. Cl.$^7$ .................................. B64C 27/605

[52] U.S. Cl. ............... 416/114; 416/134 A; 416/141; 416/170 R

[58] Field of Search .................... 416/114, 115, 416/134 A, 141, 170 R

[56] References Cited

U.S. PATENT DOCUMENTS

| | | | |
|---|---|---|---|
| 3,486,832 | 12/1969 | Stone et al. | 416/114 |
| 3,734,644 | 5/1973 | Garcia | 416/114 |
| 4,375,940 | 3/1983 | Lovera et al. | 416/114 |
| 4,630,998 | 12/1986 | Leman et al. | 416/114 |
| 5,199,849 | 4/1993 | Leman | 416/114 |
| 5,784,182 | 7/1998 | Francoeur et al. | 359/1 |
| 5,883,738 | 3/1999 | Funatsu | 359/409 |
| 6,033,182 | 3/2000 | Rampal | 416/114 |

*Primary Examiner*—Edward K. Look
*Assistant Examiner*—Richard Woo
*Attorney, Agent, or Firm*—Piper Marbury Rudnick & Wolfe

[57] ABSTRACT

The swash-plates are oscillating mounted by the non-rotating plate on a central ball joint sliding axially around a guide fixed to the structure and on which the ball joint is locked from rotation by internal splines engaging external splines of the guide. Two cotters slide in diametrically opposite grooves in the external face of the ball joint, and the non-rotating plate pivots on trunnions of the cotters around one of two perpendicular axes the other of which an axis around which the cotters pivot and which is perpendicular to the rotor axis.

15 Claims, 4 Drawing Sheets

SWASH-PLATE DEVICE FOR CONTROLLING THE PITCH OF ROTOR BLADES WITH NON-ROTATING PLATE ARTICULATED BY COTTERS ON A CENTRAL BALL JOINT

FIELD OF INVENTION

The invention concerns devices for controlling the pitch of rotor aircraft rotor blades, and in particular, controlling the pitch of a helicopter main rotor blades.

BACKGROUND OF THE PRIOR ART

The invention concerns devices for controlling the pitch of rotor aircraft rotor blades, particularly a helicopter main rotor, the rotor being of the type for which each blade is, on the one hand, rotated around an axis of rotation of a rotor shaft, or rotor axis by means of a hub rotating integrally with the shaft, and, on the other hand, rotating integrally, around a longitudinal blade pitch change axis, with at least one pitch lever controlled by a corresponding pitch rod.

The invention relates more exactly to a pitch control device of the type including a swash-plate assembly, and such that each pitch rod is connected to a plate rotating with the rotor and belonging to the swash-plate assembly, in which the rotating plate is rotary mounted on a non-rotating plate, restrained against any rotation around the rotor axis, the two plates being annular, surrounding the rotor axis and being oscillating mounted by the non-rotating plate on a central ball joint, centred on the rotor axis and mounted sliding parallel to the rotor axis around a cylindrical guide coaxial to the rotor axis and non-rotating around said rotor axis, with the result that the swash-plates can be translated axially, i.e. parallel to the rotor axis, and tilted in any direction around the rotor axis, being activated by control actuators connecting the non-rotating plate to the structure of the rotor aircraft, for the control respectively of the collective pitch and the cyclic pitch of the blades.

Generally, the two plates surround the rotor shaft and the control actuators are three servo controlled jacks or similar actuators placed between the swash-plates and the rotor aircraft structure, and articulated by ball joints at their lower and upper ends respectively on this structure and in devises of the non-rotating plate, whereas the pitch rods extend between the swash-plates and the pitch levers of the rotor blades and are articulated by ball joints at their upper and lower ends respectively on the pitch levers and in devises distributed at the periphery of the rotating plate.

Most often, the cylindrical guide is fixed in relation to the rotor aircraft structure and when the swash-plates surround the rotor shaft, the cylindrical guide is tubular, surrounds the rotor shaft, and is fixed to a housing secured to the structure of the rotor aircraft and surrounding the connection between the rotor shaft base and the main gear box.

Most often also, the rotating and upper or non-rotating and lower connection unit or units which connect respectively the rotor to the rotating plate to drive the rotation of the latter, and the structure to the non-rotating plate, to restrain the latter, is or are one or more scissor-articulated torque links with two arms connected to each other by a pivot or a hinge, which enables the two arms of each torque link to move apart or draw together in order to enable movements in the direction of the rotor axis, since the upper and lower arms of a rotating torque link are moreover articulated on the shaft or the hub of the rotor and on the rotating plate respectively, and as the lower and upper arms of a non-rotating torque link are moreover articulated on the structure of the rotor aircraft and on the non-rotating plate.

The drawbacks of these rotating and non-rotating torque links are that their articulations comprise traditional, unreliable, bearings, or, on more recent helicopters, self-lubricating ball joints and bearings including numerous carbide pins and rings, which are heavy and expensive.

Furthermore, a certain overall height or axial requirement (parallel to the rotor axis) and width requirement is necessary for the torque links to operate correctly. So, to facilitate their loading for example in the hold of a transport aeroplane and to improve their capacity to be accommodated in a hangar, for example of a ship, modern helicopters must offer the best possible vertical or axial compactness of the shaft and the main rotor assembly and of the swash-plate assembly which surrounds it. But reduction in the height or axial size of such an assembly is limited by the interference between the two arms of a torque link during folding of the latter and by the maximum swivelling angles permitted by the construction of the articulation ball joints of the torque links.

SUMMARY OF THE INVENTION

The problem at the basis of the invention is to propose a pitch control swash-plate device of the aforementioned type, with central ball joint sliding around a guide, and which comprises no non-rotating torque link for locking the non-rotating plate against rotation, but which comprises instead means enabling the axial space requirement and, preferably also the transverse space requirement, of the pitch control device, and therefore of the mast-hub assembly of a main rotor to be reduced.

A further object of the invention is to propose a pitch control device in which the non-rotating torque link or links of conventional devices is or are replaced by non-rotating plate restrainers which are better suited to the various demands of practice, and which in particular comprise parts which are less numerous, less heavy, less expensive to manufacture, assemble and to maintain, and which generate less aerodynamic drag than non-rotating torque links.

To this end, the pitch control device of the invention, of the type presented above, is characterised in that the ball joint is immobilised from rotating around said rotor axis on said guide, and two grooves, diametrically opposite in relation to the rotor axis and each of constant section, are arranged in the spherical external face of the ball joint, so as to extend in concentric circular arcs around a first diametrical axis of the ball joint which is perpendicular to the rotor axis, two cotters being, on the one hand, mounted pivoting on the non-rotating plate around a second diametrical axis of the ball joint, which is perpendicular to said first diametrical axis, and, on the other hand, mounted sliding each in one of the grooves respectively of the ball joint.

Thus, the non-rotating plate can tilt in any direction around the rotor axis by an articulation similar to a cardan, by pivoting on the cotters around the second diametrical axis and moving with the cotters in the grooves pivoting on the ball joint around the first diametrical axis.

In the device of the invention, the non-rotating torque link is replaced by means providing rotation immobilisation of the ball joint on the guide, and the rotation lock of the non-rotating plate on the ball joint provided by the cotters in the grooves of the ball joint. Simultaneously, the number of parts in the device is reduced, as is their mass, the result of which is to simplify the assembly and maintenance, and therefore to reduce the costs of production, assembly and maintenance, compared with a version with nonrotating torque link.

In accordance with an advantageously straightforward version, the ball joint is immobilised from rotating on the guide by ball joint internal splines, which extend parallel to the rotor axis and are engaged in external axial splines of said guide, which is preferably fixed to the structure of the rotor aircraft.

In a version which has an advantage in respect of the reduced number and mass of the parts, each cotter includes a head, engaged to slide in the corresponding groove of the ball joint, and a trunnion engaged to pivot in one of two bores respectively of the non-rotating plate, which emerge in an internal radial face of said non-rotating plate, and are diametrically opposite in relation to the centre of the non-rotating plate and coaxial around a diametrical axis of said non-rotating plate which is merged with said second diametrical axis of the ball joint, so as to enable the non-rotating plate to pivot on the trunnions of the cotters.

In order to simplify the manufacture and improve the dynamic balance of the device, the grooves have to advantage a same constant transverse section substantially in the shape of a right angled quadrilateral.

In this case, each cotter has, to advantage, a head in the shape substantially of a right angled parallelepiped and a cylindrical trunnion of circular section, which enables the cotters to slide correctly in the grooves without significant circumferential clearance around the rotor axis, and is therefore effective in restraining the non-rotating plate from rotating.

As regards the rotating plate, it may be rotated with the rotor with the help of at least one rotating torque link, including at least two branches, articulated one on the other and one on the rotating plate, whereas the other branch is articulated on the shaft-hub assembly of the rotor.

But it is to advantage, in order also to eliminate the rotating torque link and improve further the axial space requirement of the device and of the rotor head, that the rotating plate is rotated with the rotor with the help of a driver as described in French patent application 97 12126, i.e. a driver including two rigid rotation drive tracks extending at least partly substantially axially, parallel to the rotor axis, diametrically opposite in relation to said rotor axis and rotating integrally with one at least of the two units namely the hub and the rotor shaft, each track engaging with respectively one of two drive pins, rotating integrally with the rotating plate and diametrically opposite on the latter, one of the two engaging elements namely a track and a pin having two flanges between which the other element is engaged, so that each drive pin follows on the corresponding track a rectilinear trajectory, parallel to the rotor axis, in the case of variation in collective pitch, and a circular arc trajectory in the case of variation in cyclic pitch.

As described in the aforementioned application, each drive track is delimited to advantage in a substantially axial groove of the driver, and the corresponding pin is engaged in the groove.

In order to have good flexural and torsional rigidity and good resistance to fatigue, each groove may be formed in a substantially axial part having a "U" shaped transverse section of one of two rigid drive arms respectively, and the corresponding pin is engaged between the two flanges of the "U" shaped groove of said arm, and to limit the transverse space requirement and the drag of the device, the "U" shaped groove is open radially towards the rotor axis, and each pin projects outwards from the rotating plate, radially in relation to the centre of said rotating plate.

To take account of the fact that rotation drive stresses may be unbalanced and alternate on the two flanges of the "U" shaped groove of the arm, in particular during variations in collective and cyclic pitch, one at least of the pins includes to advantage at least one pad and/or at least one roller sliding and/or rolling respectively against one at least of the two flanges of the "U" shaped groove delimiting the corresponding drive track.

When said pin includes a pad, the pad is to advantage articulated in relation to the rotating plate, at least in rotation around an axis passing through the centre of the rotating plate, on the rotor axis, and, in a preferred version, the pad has two opposite side faces substantially plane and parallel to the flanges of the "U" shaped groove in which the pad slides, and the pad is mounted rotary and sliding around a pad support hub which is fixed on the external radial end of a pin-support arm of the rotating plate.

As a variant, the pins may each comprise one of two coaxial rollers respectively, mounted diametrically opposite on the rotating plate and rolling around their common axis.

BRIEF DESCRIPTION OF THE DRAWINGS

Other characteristics and advantages of the invention will emerge from the description given below, in a non-restrictive way, of some versions described by reference to the appended drawings in which.

DETAILED DESCRIPTIVE OF THE INVENTION

Figures 1, 2:
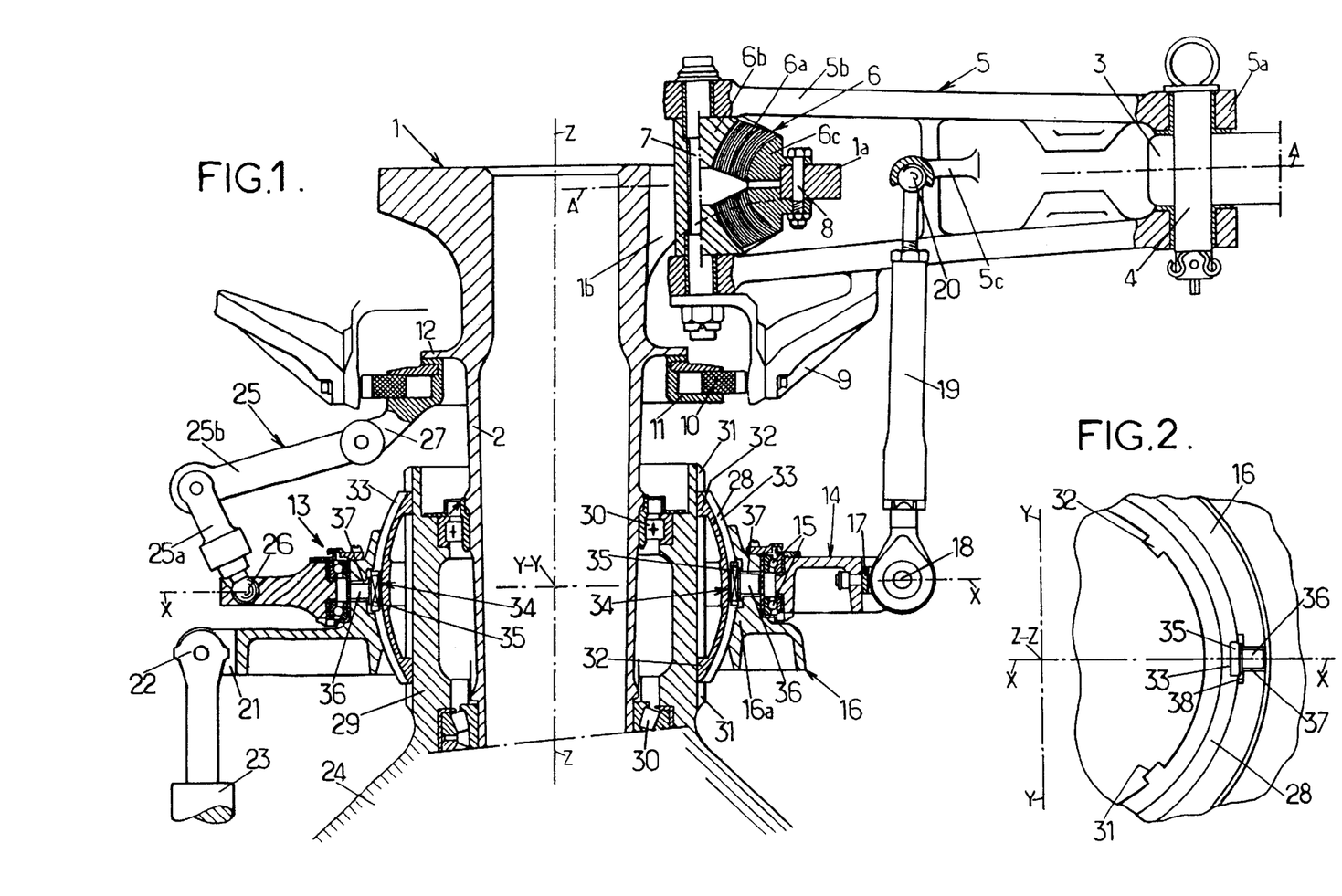
FIG. 1 is a diagrammatic and partial sectional view passing through the rotation axis of a helicopter main rotor equipped with an example of a pitch control device in accordance with the invention.
FIG. 2 is a partial sectional view, perpendicular to the axis of rotation, of the device of FIG. 1.

In FIG. 1, the helicopter main rotor shown has a known structure: it includes essentially a hub 1 integral with the upper end of a tubular rotor shaft 2, rotated by its base around its axis Z—Z, which is the axis of rotation of the rotor. Each rotor blade 3 (only one of which is partly shown in FIG. 1) is restrained by its root, and with the help of two transverse pins such as 4, in an external radial clevis 5a of a unit 5 connecting the blade 3 to the hub 1. The unit 5, henceforward called a sleeve in the rest of the description, has an internal radial clevis 5b by which the sleeve 5 is connected to the hub 1 by restraining and articulation means 6, which restrain the sleeve 5 and the blade 3 against centrifugal forces, when the rotor rotates, and enable angular clearance of the sleeve 5 and of the blade 3 in pitch, around a longitudinal pitch change axis A—A, substantially radial in relation to the rotor axis Z—Z, and in flapping and in drag, in the known way.

In this example, the restraining and articulation means 6 include a spherical laminated bearing of known structure, with a laminated central part 6a, constituted by an alternate stacking of rigid cups and layers of elastomer in the shape of spherical caps centred substantially in the external radial edge 1a of a corresponding recess 1b of the hub 1, which is of the type with a dimpled radial plate, comprising as many axial recesses 1b as the rotor comprises blades 3. On either side of its central part 6a, the spherical laminated bearing 6, housed in the corresponding recess 1b, includes an internal radial frame 6b, mounted as a spacer between the branches of the internal clevis 5b of the sleeve 5 by threaded pins such as 7, and an external radial frame 6c fixed by screw-nut assemblies such as 8 on the external radial edge 1a of the corresponding recess 1b. The spherical laminated bearing 6 is thus connected to the hub 1 by its external frame 6c and to the sleeve 5 by its internal frame 6b.

For each blade 3, a low anti-flap restrainer 9, fixed under the internal clevis 5b of the sleeve 5, works together with a droop restraining ring 10, of known structure, mounted sliding radially around the shaft 2 in a guidance ring 11 fixed, for example by bolting, to a external radial flange ring 12 of the shaft 2.

The shaft 2 is surrounded by a swash-plate assembly 13 of a blade pitch control device, and the sleeve 5 of each blade 3 is equipped, to this end, with a pitch lever 5c projecting to the side of the sleeve 5, for example towards the leading edge of the corresponding blade 3.

The swash-plate assembly 13 includes two annular plates, surrounding the rotor shaft 2, and one of which is a rotating plate 14 rotary mounted with the help of two ball bearings 15 around the central part 16a of the other plate 16 which is a non-rotating plate. External radial devises 17, equal in number to the blades 3, are evenly distributed over the external periphery of the rotating plate 14, and in each clevis 17 is restrained a ball joint 18 articulating, on the rotating plate 14, the lower end of a pitch control rod 19, the upper end of which is articulated, also by a ball joint 20, in an end clevis of the pitch lever 5c of a corresponding blade 3. Under the rotating plate 14, the non-rotating plate 16 has three external radial devises such as 21, one of which is for example directed towards the back of the helicopter and each of the two others laterally towards one of the two sides respectively of the helicopter, and in each of which is restrained a ball joint 22 for articulating, on the non-rotating plate 16 the upper end of one of three control actuators 23, for example double acting linear servo controlled jacks, respectively, the lower end of each of which is articulated, also by a ball joint (not shown) in a clevis of the structure of the helicopter, for example on the conical housing 24, which is fixed to the structure of the helicopter and surrounds the connection of the base of the rotor shaft 2 to the output of the main gear box, for driving the rotation of the shaft 2.

On its periphery and between the devises 17, the rotating plate 14 is also articulated on to two rotating units 25 (only one of which is shown), connecting the rotating plate 14 to the shaft 2 of the rotor to drive the rotation of the plate 14 around the axis Z—Z. This rotating unit may be a rotating torque link 25 of conventional structure, with two arms 25a and 25b articulated by pivoting one on the other, and one 25a by a ball joint 26 on the rotating plate 14, and the other 25b by pivoting in a clevis 27 of a torque link driver constituted, in this example, by the ring 11 fixed to the flange 12 of the shaft 2.

The two coaxial plates 14 and 16 may be translated axially, parallel to the rotor axis Z—Z, and tilted in any direction around this axis Z—Z by an axial translation and tilting guidance mechanism, which keeps the plates 14 and 16 centred on the rotor axis Z—Z. This guidance mechanism includes a central ball joint 28, on which the non-rotating plate 16 is oscillating mounted by its central part 16a, the ball joint 28 being centred on the rotor axis Z—Z and mounted sliding axially (parallel to the axis Z—Z) around a tubular cylindrical guide 29, coaxial to the rotor axis Z—Z and non-rotating around this axis, being secured to the conical housing 24. In this axial guide 29, fixed in relation to the structure of the helicopter, the shaft 2 is guided in rotation by two bearings 30.

Rotation lock of the non-rotating plate 16 around the axis Z—Z is provided by rotation lock of the ball joint 28 around the guide 29 and by rotation lock of the non-rotating plate 16 on the ball joint 28.

Rotation lock of the ball joint 28 on the guide 29 is provided by axial splines 31 (parallel to the axis Z—Z) on the external radial face of the cylindrical guide 29 and engaging in internal axial splines 32 of the upper and lower tubular end parts of the ball joint 28.

Rotation lock of the non-rotating plate 16 on the ball joint 28 is provided by means enabling simultaneously oscillations of the non-rotating plate 16 on this ball joint 28. These means include, on the ball joint 28, two grooves 33, of constant section, arranged in the spherical external face of this ball joint 28 and diametrically opposite in relation to the axis Z—Z, so that these two grooves 33 extend in concentric but diametrically opposite circular arcs around a first diametrical axis Y—Y of the ball joint 28, this axis Y—Y being non-rotating and perpendicular to the rotor axis Z—Z. As can be seen in FIG. 2, the two grooves 33 have the same transverse section, substantially rectangular in shape and are therefore symmetrical in relation to their median plane which is a radial plane passing through the axis Z—Z. The grooves 33 thus constitute guide slides for two cotters 34 in rotation around the axis Y—Y.

These cotters 34 are the means mounted on the non-rotating plate 16 to immobilise it from rotating around the ball joint 28. Each cotter 34 comprises a head 35, substantially in the shape of a right angled 30 parallelepiped, and a trunnion 36, which is cylindrical of circular section. Each cotter 34 is engaged by its head 35 in one of the grooves 33 respectively, so as to be able to slide in the corresponding groove 33 on a circular arc trajectory around the axis Y—Y and practically without circumferential clearance around the axis Z—Z. Simultaneously, each cotter has its trunnion 36 engaged pivoting in one of two bores 37 respectively arranged in the central part 16a of the non-rotating plate 16, so as to emerge in the internal radial face of this central part 16a. These two cylindrical bores 37 are diametrically opposite in relation to the centre of the non-rotating plate 16, which centre is situated at the intersection of the axes Z—Z and Y—Y, and these two bores 37 are coaxial around a diametrical axis of the non-rotating plate 16, with the result that the non-rotating plate 16 can pivot on the trunnions 36 around this diametrical axis of the nonrotating plate 16 which diametral axis is merged with a second diametrical axis X—X of the ball joint, this second diametrical axis X—X being perpendicular to the first diametrical axis Y—Y.

Thus, the two cotters 34 are mounted pivoting on the non-rotating plate 16 around this second diametrical axis X—X of the ball joint 28, thanks to the trunnions 36 projecting radially outwards (in relation to the diametrical axis Y—Y) and engaged in the bores 37 of the non-rotating plate 16, and, simultaneously, the two cotters 34 can slide by their heads 35 in the grooves 33 and thus tilt the non-rotating plate 16 around the first diametrical axis Y—Y.

This oscillating mounting of the non-rotating plate 16 on the ball joint 28 is similar to a cardan since it enables two pivot movements of the nonrotating plate 16 in relation to the ball joint 28 around two axes X—X and Y—Y perpendicular to each other.

For convenience, each bore 37 emerges in a spotfacing 38 arranged in the internal radial face of the central part 16a of the non-rotating plate 16, in order to house with sufficient clearance the external radial part of the corresponding head 35, sliding practically without clearance in the corresponding groove 33 of the ball joint 28.

The control of the three actuators 23 enables the two plates 14 and 16 and the ball joint 28 to be translated along the axis Z—Z along the guide 29 and/or the plates 14 and 16 to be tilted on the ball joint 28 in any direction around the axis Z—Z, in order to transmit variations in collective pitch and cyclic pitch respectively to the blades 3 by means of the rods 19.

Indeed, collective pitch is provided by the sliding of the central ball joint 28 on the guide 29 by the engagement of the splines 31 and 32. Cyclic pitch is provided by the tilting of the non-rotating plate 16 in any direction around the axis Z—Z thanks to the two combined pivoting movements described above around the axes X—X and Y—Y. The rotation drive stress endured by the non-rotating plate 16 being small, since created solely by the roll resistance of the balls or other bearing components in the two bearings 15, the sizing of the cotters 34 is easy to achieve in the available space on the ball joint 28 and in the non-rotating plate 16.

The assembly of the cotters 34 in their grooves 33 is ensured by tilting the central ball joint 28 by 90° around the axis Y—Y, after inserting the trunnions 36 into the bores 37, and when the swash-plate assembly 13 is on an assembly table, before its installation around the rotor shaft 2.

The use of the splines 31 and 32 on the ball joint 28 and the guide 29, and of the grooves 33 on the ball joint 28 and of the cotters 34 rotary mounted in the non-rotating plate 16 and sliding in the grooves 33, in place of a non-rotating torque link, in order to restrain the non-rotating plate 16 from rotating, enables the axial space requirement to be reduced since these means do not extend axially over a distance greater than the axial space requirement of the components not replaced, such as the guide 29, the ball joint 28 and the non-rotating plate 16, in particular its central part 16a.

But there remains at least one rotating torque link 25 to drive the rotation of the rotating plate 14.

Figure 3:
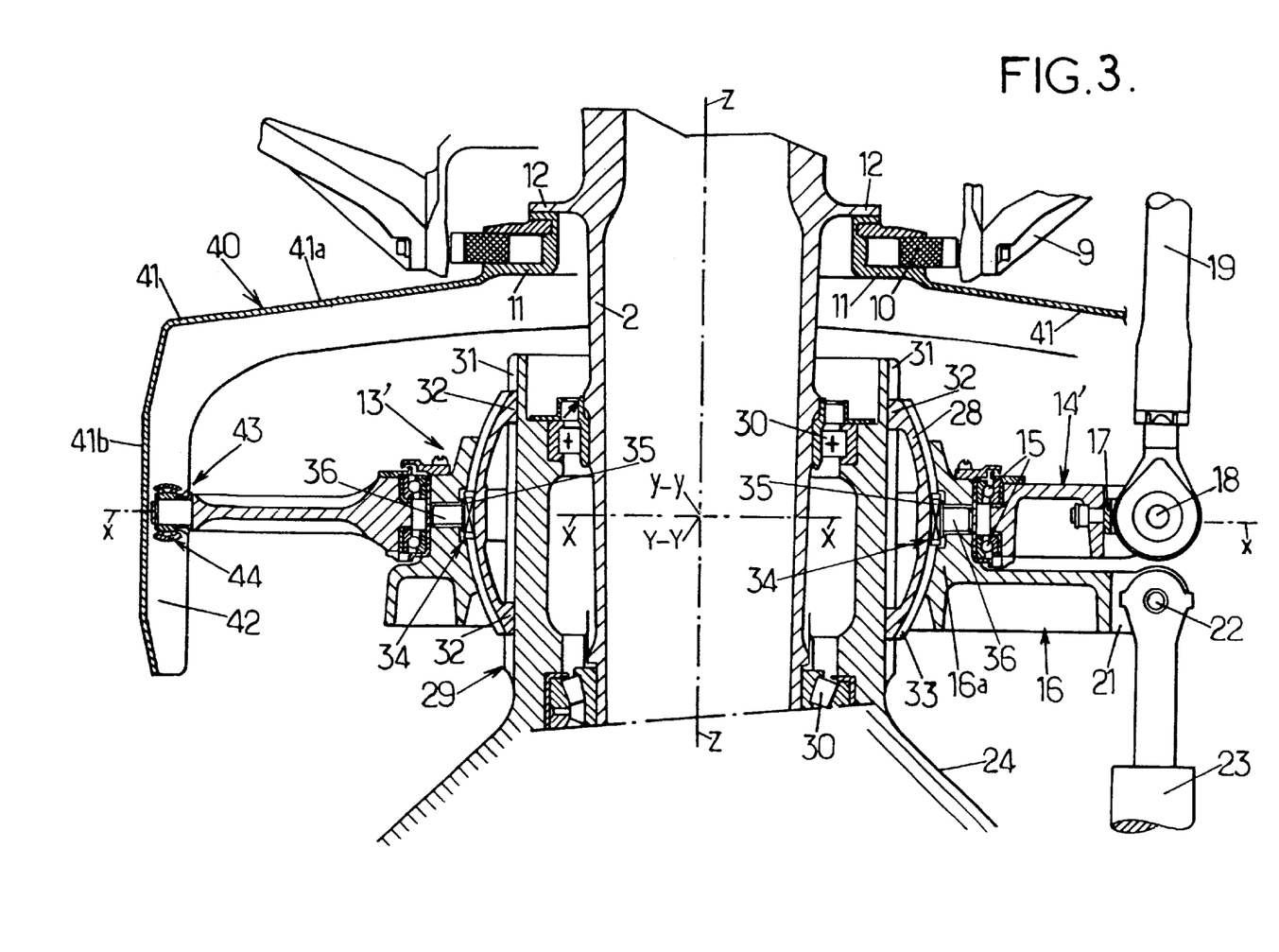
FIG. 3 is a partial view, similar to FIG. 1, of a rotor equipped with a second example of a pitch control device in accordance with the invention.
Figures 4, 4A:
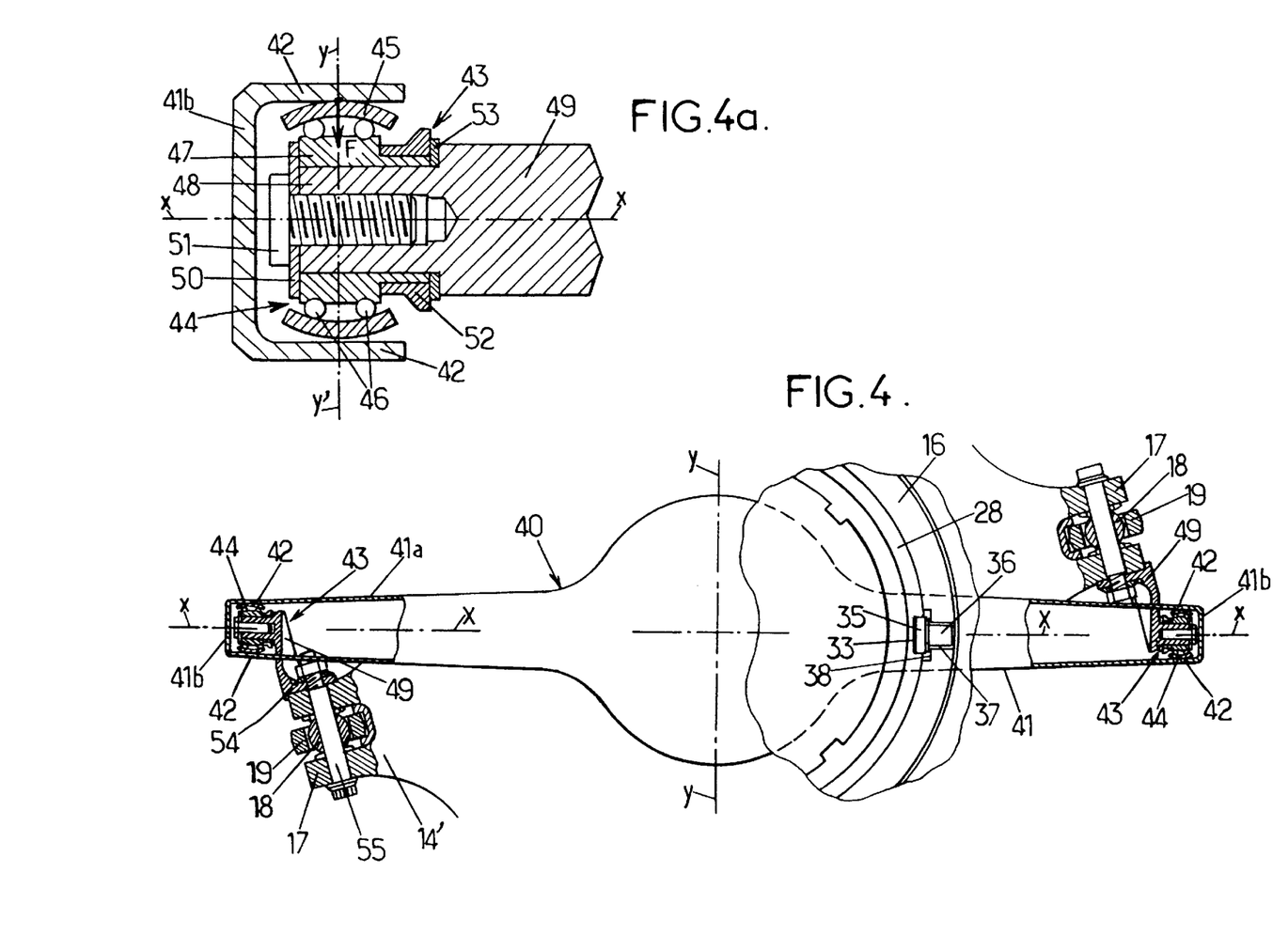
FIG. 4 is a partial transverse sectional view of the pitch control device of FIG. 3.
FIG. 4a is a larger scale view of a detail of FIG. 4, showing a drive pin with a ball jointed roller.

In order further to reduce the axial space requirement of the device, it is possible, as shown in FIGS. 3 and 4, to replace the torque link or links such as 25 by a rotating plate driver such as that described in French patent application FR 97 12126, and the effects of which combine to advantage with those of the means characteristic of the invention and described above, to restrain the non-rotating plate 16 from rotating around the rotor axis Z—Z.

The rotor and the pitch control device partially shown in FIG. 3 have a general structure similar to that of the rotor and of the device in FIG. 1, with the result that similar elements are indexed by the same reference numbers in FIGS. 1 and 3, and the description below is limited to the particularities of the version in FIG. 3, which concern solely the means for driving the rotation of the rotating plate 14' of the swash-plate assembly 13', the non-rotating plate 16 of which is, as in the previous example, rotating on the trunnions 36 of cotters 34 sliding by their heads 35 in grooves 33 of the ball joint 28 engaged by internal splines 32 with the external splines 31 of the guide 29.

It will be recalled that, in accordance with FR 97 12126 to which reference will be made for more details, and the content of which is incorporated in the present application by way of reference, driving the rotating plate 14' to rotate with the rotor is ensured by a driver 40. In FIGS. 3 and 4, the driver 40 includes two rigid arms 41, diametrically opposite in relation to the rotor axis Z—Z and fixed under the flange ring 12 of the rotor shaft 2 by a driver central part constituting, in this example, the lower annular part of the support ring 11 of the droop restraining ring 10. The driver 40 is thus rotating integrally with the shaft 2, above the swash-plate assembly 13'. Each arm 41 includes a part 41a substantially radial in relation to the axis Z—Z and prolonged by an axial part 41b parallel to the axis Z—Z over the major part of its axial length, and slightly curved towards the axis Z—Z at its lower end and at its upper end connecting to the radial part 41a. The axial arm part 41b has a "U" shaped transverse section delimiting a groove open radially towards the rotor axis Z—Z. The internal faces of the two flanges 42 of the "U" shaped groove in each axial arm part 41b thus form a rigid rotation drive track of one of two drive pins 43 respectively secured to the rotating plate 14' and diametrically opposite on the latter (see FIG. 4), each pin 43 projecting radially outwards from the rotating plate 14' and engaged between the two flanges 42 of the "U" shaped groove of one of the axial arm parts 41b respectively.

In this example, each pin 43 includes one of two coaxial rollers 44 respectively each rolling in one of the "U" shaped grooves respectively, against one at least of the flanges 42 of the "U" shaped groove delimiting the corresponding drive track, and around the common axis of the rollers 44, which is a diametrical axis of the rotating plate 14' and located as x—x in FIGS. 3 and 4 [it should be noted that, in the particular position of the rotating plate 14' in FIGS. 3 and 4, the axes x—x and X—X are merged, but the axis x—x is a rotating axis, whereas the axis X—X is a non-rotating axis around the rotor axis Z—Z].

In operation, the trajectory and behaviour of the rollers 44 are as follows: for cyclic pitch, the two rollers 44 roll in the "U" shaped grooves of the axial arm parts 41b of the driver 40 following an alternate circular trajectory portion (sinusoidal motion) around a second diametrical axis y—y (perpendicular to x—x) of the rotating plate 14'. [Just as for axes X—X and x—x, Y—Y and y—y are merged in FIGS. 3 and 4, but y—y is a rotating axis whereas Y—Y is non-rotating around Z—Z]. In the case of variation in collective pitch, the two rollers 44 roll in the "U" shaped grooves between the flanges 42 following a rectilinear trajectory, parallel to the rotor axis Z—Z, upwards (towards the hub 1) or downwards (towards the structure and the conical housing 24) in accordance with the collective pitch required. In the case of combined cyclic pitch and collective pitch, both rollers 44 are compelled to pivot around an axis y'—y' (see FIG. 4a), which is parallel to the axis y—y and passes through the centre of the roller 44. This pivot angle is maximum at the upper and lower ends of the trajectory of the rollers 44 between respectively the maximum collective pitch and the maximum positive cyclic pitch, on the one hand, and, on the other hand, the minimum collective pitch and the maximum negative cyclic pitch.

In order to eliminate all risk of sliding during collective pitch change (trajectory parallel to the rotor axis Z—Z), each roller 44 is preferably a ball joint roller, as shown on a larger scale in FIG. 4a.

FIG. 4a shows the structure and assembly of a ball joint roller, the proposed use of which is to drive the rotation around the axis Z—Z of a pin 43 by the same flange 42 of the "U" shaped groove in which the pin 43 is engaged, the contact stress F being therefore always on the same flange 42. The roller 44 in FIGS. 3, 4 and 4a includes a ball joint 45, centred on the intersection of the axes x—x and y'—y' mentioned above, and mounted rotary around the diametrical axis x—x of the rotating plate 14' and pivoting around the axis y'—y' by two ball bearings 46 offset along the axis x—x on an annular roller support hub 47 on the external radial and cylindrical end 48 of a pin-support arm 49 secured to the rotating plate 14'. The hub 47 is restrained on the arm 49 by the support of its axial end turned towards the arm 49, and of reduced external diameter, against a shoulder connecting the end part 48 to the arm 49, and by the support of a washer 50 against the other axial end of the hub 47, the washer 50 being kept in place by the head of a screw 51 with shank screwed into the end part 48 of the pin support arm 49. Moreover, in order to limit the pivot angle of the ball joint 45 around the axis y'—y' and reduce friction, a ring 52 is rotary mounted around the diametrical axis x—x on the axial end of reduced external diameter of the annular hub 47. The maximum pivot angle of the ball joint 45 is limited on the rotating ring 52 coaxial to the roller 44, by a truncated contact face with the top situated at the intersection of the axes x—x and y'—y'. An anti-friction ring 53 is preferably interposed between the shoulder on the pin support 49, on one side, and on the other side, the rotating ring 52 and the hub 47.

During variations in blade 3 and sleeve 5 pitch, in order to avoid any interference between the pitch rods 19 and the driver 40, and in particular between each of the two arms 41 and the pitch rod 19 which is the nearest, circumferentially, to each of these two arms 41, the pin support arm 49, which could be a radial arm of a single piece with the rotating plate 14', is preferably an angled arm, as shown in FIG. 4, and added projecting laterally on one side of the clevis 17 of the rotating plate 14' in which clevis is articulated the closest pitch rod 19 to the arm of the driver 41 being considered.

To this end, the angled pin support arm 49 has a tab 54 fixed against the external side face of one of the two branches of the clevis 17 by the screw-nut assembly 55 forming simultaneously a restrainer axis of the ball joint 18 of the lower end of the pitch rod 19 in this clevis 17 of the rotating plate 14'.

Figure 5:
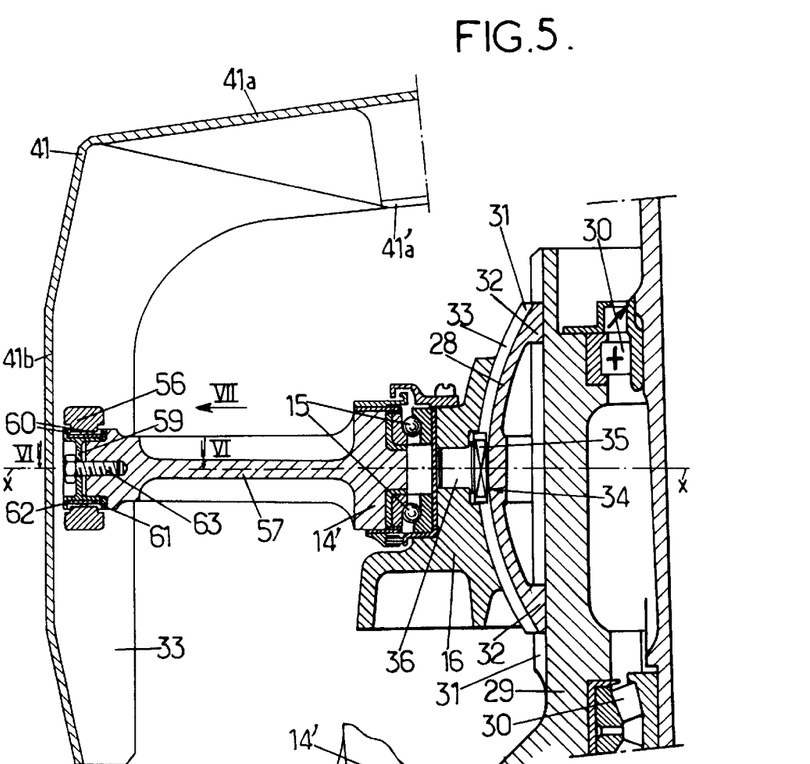
FIG. 5 is a partial axial semi-sectional view of a variant of the device in FIG. 3.
Figure 6:
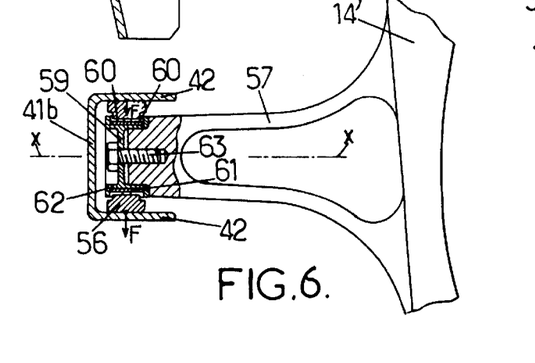
FIG. 6 is a partial sectional view in accordance with VI—VI of FIG. 5, and, FIG. 7 is a partial view, in accordance with the arrow VII of FIG. 5.
Figure 7:
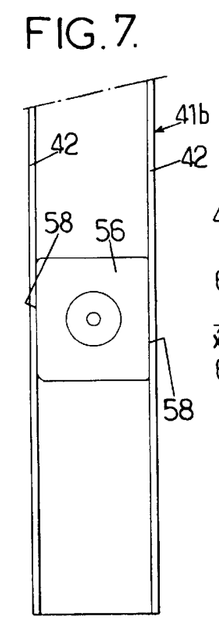

FIGS. 5 to 7 show a variant of the driver device 40 in FIGS. 3 and 4 with a second drive pin example, usable in place of the pin 43 with roller 44 in FIGS. 3 to 4a in case of pin rotation drive being carried out with a contact stress F applying alternately to one or other of the two flanges 42 (see FIG. 6) of the "U" shaped groove.

In this variant, each pin includes one of two pads 56 respectively sliding alternately against one or other of the two flanges 42 of the axial part 41b of the corresponding rigid arm 41 of the driver 40, identical to that of the previous example. To facilitate load transfer between the flanges 42 and the pad 56, by reducing friction, the internal face of the flanges 42 may have a carbide coating on its zone corresponding to the trajectory of the pad 56, the external zones of the faces of which, coming into contact with the flanges 42, can also have carbide coatings. Each pad 56 has the general external shape of a relatively flat right angled parallelepiped, punched with a central cylindrical aperture of circular section. Through this aperture, each pad 56 can be articulated in relation to the rotating plate 14', to which the pad 56 is connected by a pin support arm 57 radial in relation to the centre of the rotating plate 14' and of a single piece with the latter, made for example of aluminium, whereas the driver 40 and its arms 41 are made for example of steel. Each pad 56 thus has two opposite side faces 58 which are plane and parallel to each other and to the flanges 42 of the "U" shaped groove in which the pad 56 slides, and through its central aperture each pad 56 is mounted rotary and sliding around a pad support hub 59 on the external radial end of the pin support arm 57. To this end, anti-friction shoulder rings 60 are mounted in the central aperture of the pad 56, and around an anti-friction ring 61 housed in the bottom of a "U" shaped groove delimited by an annular rim 62 on the periphery of the hub 59, which is centred by its rim 62 around the cylindrical external radial end of the pin support arm 57 and kept against this end by the head of a screw 63 with the shank traversing the central part of the hub 59 and screwed into this end of arm 57.

In this variant, the substantially radial part 41a of each driver arm 41 can have a "U" shaped structure open downwards, i.e. towards the swash-plate assembly 13', as in the example in FIGS. 3 and 4 or else, as can be seen in FIG. 5, a box-type structure shown as 41'a, so as to offer greater rigidity.

The blade pitch control devices of the invention as described above, enable main rotor mast-hub assemblies to be made which have a smaller vertical or axial space requirement compared with known versions with non-rotating torque links for the restraint of non-rotating plates and rotating torque links for driving the rotating plate of the swash-plate assembly.

In addition, the means for rotation lock of the non-rotating plate and possibly means for driving the rotating plate as described above include fewer parts and are less heavy and less expensive to manufacture, assemble and maintain than versions with non-rotating and rotating torque links.

In particular, the branches of at least the non-rotating torque links are eliminated, as are their articulations including carbide pins and rings, which are heavy and expensive.

What is claimed is:

1. A device for controlling a pitch of a plurality of blades of an aircraft rotor on which each blade is, firstly, rotated around an axis of rotation of a shaft of the rotor by means of a hub rotating integrally with the shaft, and, secondly, rotating integrally, around a longitudinal blade pitch change axis, with at least one pitch lever controlled by a corresponding pitch rod, connected to a plate rotating with the rotor and belonging to a swash-plate assembly in which the rotating plate is rotary mounted on a non-rotating plate, restrained against any rotation around the rotor axis, the two plates being annular, surrounding the rotor axis, and being oscillating mounted by the non-rotating plate on a central ball joint, centered on the rotor axis and mounted sliding parallel to the rotor axis around a cylindrical guide coaxial to the rotor axis and non-rotating around the said rotor axis, with the result that the swash-plates can be translated parallel to the rotor axis and tilted in any direction around the rotor axis, being activated by control actuators connecting the non-rotating plate to the structure of the rotor aircraft, for the control of a collective pitch and a cyclic pitch respectively of the blades, wherein the ball joint is immobilized in rotation around the said rotor axis on said guide, and two grooves, diametrically opposite in relation to the rotor axis and each of a constant section, are arranged in a spherical external face of the ball joint, so as to extend in concentric circular arcs around a first diametrical axis of the ball joint which is perpendicular to the rotor axis, two cotters being, on the one hand, mounted pivoting on the non-rotating plate around a second diametrical axis of the ball joint, which second diametrical axis is perpendicular to said first diametrical axis, and, on the other hand, mounted sliding each in one of the grooves respectively of the ball joint.

2. A device in accordance with claim 1, wherein the ball joint is immobilized in rotation on the guide by internal splines of the ball joint, which internal splines extend parallel to the rotor axis and engage in external axial splines of said guide secured to the structure of the rotor aircraft.

3. a device in accordance with claim 1, wherein each cotter includes a head, engaged to slide in a corresponding groove of the ball joint, and a trunnion engaged to pivot in one of two bores respectively of the non-rotating plate, which bores emerge in an internal radial face of said non-rotating plate, and are diametrically opposite in relation to the center of the non-rotating plate and coaxial around a diametrical axis of said non-rotating plate which the diametrical axis is merged with said second diametrical axis of the ball joint, so as to enable the non-rotating plate to pivot on the trunnions of the cotters.

4. A device in accordance with claim 3, wherein the grooves have a same constant transverse section substantially in the shape of a right angled quadrilateral.

5. A device in accordance with claim 4, wherein each cotter has the head in the shape substantially of a right angled parallel-piped and a cylindrical trunnion of circular section.

6. A device in accordance with claim 1, wherein the rotating plate is rotated with the rotor with the help of at least one rotating torque link, including at least two branches articulated one on the other and one on the rotating plate, whereas the other branch is articulated on the rotor shaft-hub assembly.

7. A device in accordance with claim 1, wherein the rotating plate is rotated with the rotor with the help of a driver including two rotation drive rigid tracks, extending at least partly substantially axially, parallel to the rotor axis, diametrically opposite in relation to said rotor axis and rotating integrally with one at least of two units that are the hub and the shaft of the rotor, each track working together with one of two drive pins respectively, rotating integrally with the rotating plate and diametrically opposite on the latter, one of two engaging elements namely a track and a pin having two flanges between which the other of the two engaging elements is engaged, so that each drive pin follows on the corresponding track a rectilinear trajectory, parallel to the rotor axis, in the case of variation in the collective pitch, and a circular arc trajectory centered on the rotor axis, in the case of variation in the cyclic pitch.

8. A device in accordance with claim 7, wherein each drive track is delimited in a substantially axial groove of the driver and the corresponding pin is engaged in the groove.

9. A device in accordance with claim 8, wherein each groove is formed in a substantially axial part having a "U" shaped transverse section of one of two rigid drive arms respectively, and the corresponding pin is engaged between the two flanges of the "U" shaped groove of said arm.

10. A device in accordance with claim 9, wherein said "U" shaped groove is open radially towards the rotor axis, and each pin projects outwards from the rotating plate, radially in relation to the center of said rotating plate.

11. A device in accordance with claim 9, wherein one at least of the pins includes at least one pad sliding against one at least of the two flanges of the "U" shaped groove delimiting the corresponding drive track.

12. A device in accordance with claim 11, wherein the pins each comprise one of two coaxial rollers respectively, mounted diametrically opposite on the rotating plate and rolling around a common axis.

13. A device in accordance with claim 11, wherein said pad is articulated in relation to the rotating plate.

14. A device in accordance with claim 13, wherein said pad has two opposite side faces substantially plane and parallel to the flanges of the "U" shaped groove in which the pad slides, and the pad is mounted rotary and sliding around a pad support hub which is fixed to an external radial end of a pin support arm of the rotating plate.

15. A device in accordance with claim 9, wherein one at least of the pins includes at least one roller rolling against one at least of the two flanges of the "U" shaped groove delimiting the corresponding drive track.

* * * * *